US009948448B2

(12) United States Patent
Liao et al.

(10) Patent No.: US 9,948,448 B2
(45) Date of Patent: Apr. 17, 2018

(54) CLOCK RECOVERY METHOD AND DEVICE (71) Applicant: ZTE CORPORATION, Guangdong (CN)

(72) Inventors: Qun Liao, Shenzhen (CN); Yi Cai, Shenzhen (CN); Weiqin Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/029,249

(22) PCT Filed: May 28, 2014

(86) PCT No.: PCT/CN2014/078655
§ 371 (c)(1),
(2) Date: Apr. 13, 2016

(87) PCT Pub. No.: WO2014/180404
PCT Pub. Date: Nov. 13, 2014

(65) Prior Publication Data
US 2016/0261398 A1 Sep. 8, 2016

(30) Foreign Application Priority Data
Oct. 15, 2013 (CN) .......................... 2013 1 0482054

(51) Int. Cl.
*H04L 7/00* (2006.01)
*H04B 10/61* (2013.01)
(Continued)

(52) U.S. Cl.
CPC ....... *H04L 7/0037* (2013.01); *H04B 10/6161* (2013.01); *H04B 10/6162* (2013.01);
(Continued)

(58) Field of Classification Search
CPC ............ H04B 10/6165; H04B 10/6166; H04B 10/616; H04B 10/6161; H04B 10/6162;
(Continued)

(56) References Cited

U.S. PATENT DOCUMENTS

| | | | |
|---|---|---|---|
| 2012/0087680 A1* | 4/2012 | Xie | .................. H04B 10/60 398/208 |
| 2013/0243420 A1 | 9/2013 | Li et al. | |
| 2015/0171972 A1* | 6/2015 | Xie | .................. H04B 10/616 398/205 |

FOREIGN PATENT DOCUMENTS

| | | |
|---|---|---|
| CN | 1424853 A | 6/2003 |
| CN | 101378378 | 3/2009 |

(Continued)

OTHER PUBLICATIONS

Digital Timing Recovery Combined with adaptive Equalization for Optical Coherent Receivers; Zhou Xian et al. Beijing University of Posts and Telecommunications. XP031623309.
(Continued)

*Primary Examiner* — Betsy Deppe
(74) *Attorney, Agent, or Firm* — Ling Wu; Stephen Yang; Ling and Yang Intellectual Property (57) ABSTRACT

A clock recovery method and device relate to the field of communication; and address the problem of the non-synchronization between the sampling clock of the transmitter and the sampling clock of the receiver. The method includes calculating a clock sampling error, a signal phase error compensation value, and a residual phase error compensation value based on data obtained after polarization demultiplexing and equalizing; adjusting a sampling clock based on the clock sampling error; performing phase adjustment for the first time based on the signal phase error compensation value; performing phase adjustment for the second time based on the residual phase error compensation value.
(Continued)

The technical scheme provided by the embodiments of the present document is adapted to a coherent data receiver, and achieve the mechanism of the three levels of error compensation.

12 Claims, 4 Drawing Sheets

(51) Int. Cl.
 *H04L 5/04* (2006.01)
 *H04L 27/26* (2006.01)
(52) U.S. Cl.
 CPC ..... *H04B 10/6164* (2013.01); *H04B 10/6165* (2013.01); *H04B 10/6166* (2013.01); *H04L 5/04* (2013.01); *H04L 27/265* (2013.01)
(58) Field of Classification Search
 CPC . H04B 10/6164; H04B 10/614; H04L 7/0037; H04L 7/0016; H04L 7/0054; H04L 7/0079
 See application file for complete search history.

(56) References Cited

FOREIGN PATENT DOCUMENTS

| | | |
|---|---|---|
| CN | 102231648 A | 11/2011 |
| CN | 103220252 A | 7/2013 |
| EP | 2273703 A1 | 1/2011 |
| EP | 2357740 A1 | 8/2011 |
| EP | 2615769 A1 | 7/2013 |
| KR | 97068393 A | 10/1997 |
| WO | 2010134321 A1 | 11/2010 |
| WO | 2011100867 A1 | 8/2011 |
| WO | 2013083190 A1 | 6/2013 |

OTHER PUBLICATIONS

A Novel Dispersion and PMD Tolerant Phase Detector for Coherent Transmission Systems; Han Sun and Kuang-Tsan Wu; OSA/OFC/NFOEC 2011; XP031972537.

* cited by examiner

CLOCK RECOVERY METHOD AND DEVICE

TECHNICAL FIELD

The present document relates to the technical field of clock recovery, and in particular, to a clock recovery method and device.

BACKGROUND OF THE RELATED ART

Sampling clocks of a transmitter and a receiver in a communication system may not be fully synchronized, for obtaining a sending signal at the receiving end correctly, the problem of the non-synchronization between the clock of the transmitter and the clock of the receiver needs to be solved, and clock recovery is exactly used to address the problem of the non-synchronization of the sampling clocks of the transmitter and receiver.

Coherent digital receivers are commonly used in modern communication digital receivers, and the coherent digital receiver can compensate for transmission impairments of a received signal in a digital domain, such as chromatic dispersion compensation, polarization mode dispersion compensation, clock recovery, frequency offset compensation, and phase compensation, etc. A clock recovery module may extract a sampling clock frequency and a sampling phase from a sampled digital signal correctly, and compensate the signal for an error, so as to demodulate a transmitting signal correctly.

SUMMARY

The embodiments of the present document provide a clock recovery method and device to address the problem of the non-synchronization between the clock of the transmitter and the clock of the receiver.

A clock recovery method, including:

calculating a clock sampling error, a signal phase error compensation value, and a residual phase error compensation value based on data obtained after polarization demultiplexing and equalizing;

adjusting a sampling clock based on the clock sampling error;

performing phase adjustment for a first time based on the signal phase error compensation value; and performing phase adjustment for a second time based on the residual phase error compensation value.

Alternatively, the step of calculating a clock sampling error, a signal phase error compensation value, and a residual phase error compensation value based on data obtained after polarization demultiplexing and equalizing, includes:

obtaining a phase detection error based on a following expression:

$$e(m) = \sum_{i=1}^{N/2} conj(x_f^{eq\_out}(i)) \cdot x_f^{eq\_out}(i+N/2) + \sum_{i=1}^{N/2} conj(y_f^{eq\_out}(i)) \cdot y_f^{eq\_out}(i+N/2),$$

wherein, $x_f^{eq\_out}$ and $y_f^{eq\_out}$ represent data of x, y in two polarization states obtained after polarization demultiplexing and equalizing, i is a frequency-domain index value, conj represents a conjugate operation, N is a number of points of a Fourier transforming module FT, m is an index of a phase detection result, e(m) is the phase detection error, wherein, N is a positive integer;

calculating a phase detection value corresponding to each frequency-domain data segment based on a following expression:

$$\tau(m) = angle(e(m))/\pi,$$

wherein, $\tau(m)$ is a phase detection value, angle represents a phase angle operation;

filtering the phase detection value for calculating the clock sampling error to obtain the clock sampling error;

filtering the phase detection value for calculating the signal phase error to obtain the signal phase error compensation value; and filtering the phase detection value for calculating the residual phase error to obtain the residual phase error compensation value.

Alternatively, the step of adjusting a sampling clock based on the clock sampling error, includes:

changing a sampling frequency of a analog-to-digital converter ADC based on the clock sampling error.

Alternatively, the step of performing phase adjustment for a first time based on the signal phase error compensation value, includes:

performing phase adjustment for the first time by a following expression based on the signal phase error compensation value:

$$x_f^p(n) = \begin{cases} x_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) & 1 \leq n \leq \frac{N}{2} \\ x_f(n) \cdot \left( \begin{array}{l} \cos\left(\frac{2 \cdot \pi \cdot (n-N-1) \cdot \mu}{N}\right) + \\ j \cdot \sin\left(\frac{2 \cdot \pi \cdot (n-N-1) \cdot \mu}{N}\right) \end{array} \right) & \frac{N}{2}+1 \leq n \leq N \end{cases}$$

$$y_f^p(n) = \begin{cases} y_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) & 1 \leq n \leq \frac{N}{2} \\ y_f(n) \cdot \left( \begin{array}{l} \cos\left(\frac{2 \cdot \pi \cdot (n-N-1) \cdot \mu}{N}\right) + \\ j \cdot \sin\left(\frac{2 \cdot \pi \cdot (n-N-1) \cdot \mu}{N}\right) \end{array} \right) & \frac{N}{2}+1 \leq n \leq N \end{cases}$$

wherein, n is a frequency-domain index, N is a number of points of FT, $\mu$ is a phase difference required to adjust, $x_f(n), y_f(n)$ are frequency-domain data before the phase adjustment, $x_f^p(n), y_f^p(n)$ are frequency-domain data obtained after the phase adjustment, wherein, N is a positive integer.

Alternatively, the step of performing phase adjustment for a second time based on the residual phase error compensation value, includes:

performing phase adjustment for the second time by a following expression based on the residual phase error compensation value:

$x_f^p(n) =$ $$\begin{cases} x_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) 1 \le n \le \frac{N}{2} \\ x_f(n) \cdot \left( \begin{array}{c} \cos\left(\frac{2 \cdot \pi \cdot (n-N-1) \cdot \mu}{N}\right) + \\ j \cdot \sin\left(\frac{2 \cdot \pi \cdot (n-N-1) \cdot \mu}{N}\right) \end{array} \right) \frac{N}{2} + 1 \le n \le N \end{cases}$$

$$y_f^p(n) = \begin{cases} y_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) 1 \le n \le \frac{N}{2} \\ y_f(n) \cdot \left( \begin{array}{c} \cos\left(\frac{2 \cdot \pi \cdot (n-N-1) \cdot \mu}{N}\right) + \\ j \cdot \sin\left(\frac{2 \cdot \pi \cdot (n-N-1) \cdot \mu}{N}\right) \end{array} \right) \frac{N}{2} + 1 \le n \le N \end{cases}$$

wherein, n is a frequency-domain index, N is a number of points of FT, μ is a phase difference required to adjust, $x_f(n), y_f(n)$ are frequency-domain data before the phase adjustment, $x_f^p(n), y_f^p(n)$ are frequency-domain data obtained after the phase adjustment, wherein, N is a positive integer.

Alternatively, before the step of performing phase adjustment for a first time based on the signal phase error compensation value, the method further includes:

sampling a digital signal based on the changed sampling frequency of the ADC;

performing front-end digital signal processing on the sampled digital signal; and converting data obtained after front-end digital signal processing into frequency-domain signal data.

Alternatively, before the step of performing phase adjustment for a second time based on the residual phase error compensation value, the method further includes:

performing a polarization separation on digital signal data obtained after performing phase adjustment for the first time, and equalizing the signal.

Alternatively, following the step of adjusting a phase for the second time based on the residual phase error compensation value, the method further includes:

after the step of performing phase adjustment for a second time based on the residual phase error compensation value, the method further includes:

transforming frequency-domain data obtained after performing phase adjustment for the second time into time-domain data for subsequent buffering.

Alternatively, the method further includes:

filtering the phase detection value for calculating an interpolating instruction, deleting instruction, or holding instruction, to obtain the interpolating instruction, deleting instruction, or holding instruction.

Alternatively, the step of transforming the frequency-domain data obtained after performing phase adjustment for the second time into time-domain data for subsequent buffering, the method further includes:

buffering received time-domain data; and performing, respectively, a corresponding interpolating operation, deleting operation, or holding operation on the received time-domain data based on the interpolating instruction, deleting instruction, or holding instruction.

The present document further provides a clock recovery device, including: a clock error calculation module, a analog-to-digital converter ADC module, a first sampling phase adjustment module, and a second sampling phase adjustment module, wherein, the clock error calculation module is configured to calculate a clock sampling error, a signal phase error compensation value, and a residual phase error compensation value based on data obtained after polarization demultiplexing and equalizing;

the ADC module is configured to adjust a sampling clock based on the clock sampling error;

the first sampling phase adjustment module is configured to perform phase adjustment for a first time based on the signal phase error compensation value; and the second sampling phase adjustment module is configured to perform phase adjustment for a second time based on the residual phase error compensation value.

Alternatively, the clock error calculation module includes:

a clock error phase detection unit configured to obtain a phase detection error based on a following expression:

$$e(m) = \sum_{i=1}^{N/2} conj(x_f^{eq\_out}(i)) \cdot x_f^{eq\_out}(i+N/2) + \sum_{i=1}^{N/2} conj(y_f^{eq\_out}(i)) \cdot y_f^{eq\_out}(i+N/2),$$

wherein, $x_f^{eq\_out}$ and $y_f^{eq\_out}$ represent data of x, y in two polarization states obtained after polarization demultiplexing and equalizing, i is a frequency-domain index value, conj represents a conjugate operation, N is a number of points of a Fourier transforming module FT, m is an index of a phase detection result, e(m) is the phase detection error, wherein, N is a positive integer;

thereafter, calculate a phase detection value corresponding to each frequency-domain data segment based on a following expression:

τ(m)=angle(e(m))/π, wherein, τ(m) is a phase detection value, angle represents a phase angle operation;

a first clock error calculation unit configured to filter the phase detection value for calculating the clock sampling error to obtain the clock sampling error;

a second clock error calculation unit configured to filter the phase detection value for calculating the signal phase error to obtain the signal phase error compensation value; and a third clock error calculation unit configured to filter the phase detection value for calculating the residual phase error compensation value to obtain the residual phase error compensation value.

Alternatively, the clock error calculation module further includes:

a fourth clock error calculation unit configured to filter the phase detection value for calculating an interpolating instruction, deleting instruction, or holding instruction, to obtain the interpolating instruction, deleting instruction, or holding instruction.

Alternatively, the device further includes:

a BUFFER module configured to buffer received time-domain data, and perform, respectively, a corresponding interpolating operation, deleting operation, or holding operation on the received time-domain data based on the interpolating instruction, deleting instruction, or holding instruction.

Alternatively, the device further includes:

a polarization demultiplexing and equalizing module configured to perform a polarization separation on digital signal data obtained after performing phase adjustment for the first time, and equalizing the signal.

The embodiments of the present document provide a clock recovery method and device, wherein, the clock sampling error, the signal phase error compensation value, and the residual phase error compensation value are calculated based on data obtained after polarization demultiplexing and equalizing, the sampling clock is adjusted based on the clock sampling error, the phase adjustment is performed for the first time based on the signal phase error compensation value, and then the phase adjustment is performed for the second time based on the residual phase error compensation value, so that mechanism of the three levels of error compensation is achieved to address the problem of the non-synchronization between the clock of the transmitter and the clock of the receiver.

PREFERRED EMBODIMENTS OF THE INVENTION

The embodiments of the present document provide a clock recovery method and device. The embodiments of the present document will be described in detail in combination with the accompanying drawings below. It should be noted that the embodiments in the present document and the characteristics in the embodiments can be optionally combined with each other in the condition of no conflict.

Firstly, the embodiment 1 of the present document will be described in combination with the accompanying drawings.

Figure 1:
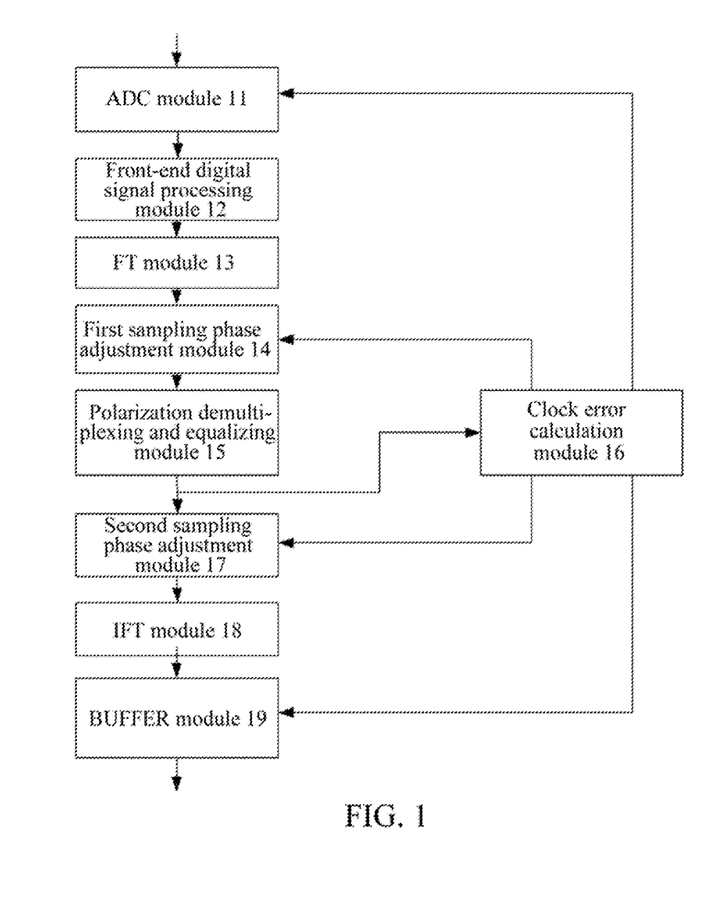
FIG. 1 is a structural schematic diagram of the clock recovery device provided by the first embodiment of the present document.

The embodiment of the present document provides a clock recovery device whose structure is as shown in FIG. 1, including the analog-to-digital converter (ADC) module 11, the front-end digital signal processing module 12, the Fourier transforming module (FT) 13, the first sampling phase adjustment module 14, the polarization demultiplexing and equalizing module 15, the clock error calculation module 16, the second sampling phase adjustment module 17, the inverse Fourier transforming module (IFT) 18, and the BUFFER module 19.

The ADC module 11 is configured to convert the received analog signal into the digital signal, and transmit the digital signal to the front-end digital signal processing module, adjust the sampling clock based on the clock sampling error calculated by the clock error calculation module.

The front-end digital signal processing module 12 is configured to perform the front-end digital signal processing, including time delay adjustment, and DC removing, etc., on the received digital signal, then transmit the processed signal to the FT module 13.

The FT module 13 is configured to transform a received time-domain signal into a frequency-domain signal, then transmit the processed frequency-domain signal to the first sampling phase adjustment module.

The clock error calculation module 16 is configured to calculate the clock sampling error, the signal phase error compensation value, and the residual phase error compensation value based on data obtained after polarization multiplexing and equalizing, and transmit the calculated clock sampling error to the ADC module 11, transmit the calculated signal phase error compensation value to the first sampling phase adjustment module 14, and transmit the calculated residual phase error compensation value to the second sampling phase adjustment module 17, and generate the sampling point holding instruction, the sampling point interpolating instruction, and the sampling point deleting instruction to transmit to the BUFFER module.

The first sampling phase adjustment module 14 is configured to perform the phase adjustment for the first time based on the signal phase error compensation value to adjust the phase of the received signal, then transmit the processed signal to the sequent polarization demultiplexing and equalizing module.

The polarization demultiplexing and equalizing module 15 is configured to perform the polarization separation on the digital signal data obtained after performing phase adjustment for the first time, and equalize the signal; correspondingly, perform the polarization separation on the received digital signal and then equalize the signal to remove the colored noise of the signal (including residual chromatic dispersion and polarization mode dispersion, etc.); then transmit the processed signal to the sequent second sampling phase adjustment module and the clock error calculation module.

The second sampling phase adjustment module 17 is configured to perform the phase adjustment for the second time based on the residual phase error compensation value.

The clock error calculation module 16 is a core module of the whole device. Since the chromatic dispersion, the polarization mode dispersion, and other noises have a major effect on the error calculation, the clock error calculation module 16 is arranged behind the polarization demultiplexing and equalizing module to remove the effect of the noises on the error calculation.

The clock error calculation module 16 is configured to calculate three levels of clock error, and transmit the relatively fixed clock error compensation value to the ADC module to adjust the sampling frequency of the ADC module as close to the sampling clock of a DAC as possible. The clock error is presented as a change of the sampling phase in the view of data, because the clock error calculation module and the first sampling phase adjustment module form a feedback loop, the calculated phase error is based on data of several clocks ago, and is with a certain deviation from the current phase error, for this reason, the first sampling phase adjustment module only processes the slowly-changed phase error. The clock error calculation module and the second sampling phase adjustment module form a feed-forward loop so as to process the phase error of current data in real time, thus, the residual phase error left by the first sampling phase adjustment module is processed by the second sampling phase adjustment module. By virtue of such mechanism of three levels of error compensation, various types of clock errors can be compensated effectively.

Furthermore, due to the error between the clock of the digital-to-analog converter DAC and the clock of the ADC, the received data is more than or less than the transmitted data, the clock error calculation module is configured to calculate the interpolating instruction and the deleting instruction simultaneously, and then transmit the interpolating instruction and the deleting instruction to the BUFFER module following the IFT module for performing the interpolating operation and the deleting operation.

The second sampling phase adjustment module 17 is configured to perform the phase adjustment of the sampling signal based on the residual phase error compensation value calculated by the clock error calculation module, then transmit the processed signal to the IFT module 18;

The IFT module 18 is configured to receive the data from the second sampling phase adjustment module and transform frequency-domain data into time-domain data, then transmit the processed signal to the sequent BUFFER module.

The BUFFER module 19 is configured to buffer received time-domain data (to receive the data from the IFT module), and perform the corresponding operations on the received data, e.g. the interpolating operation or deleting operation based on the interpolating instruction and the deleting instruction, respectively, passed by the clock error calculation module. Thereafter, the BUFFER module 19 transmits the processed signal to other subsequent digital signal processing modules.

Figure 2:
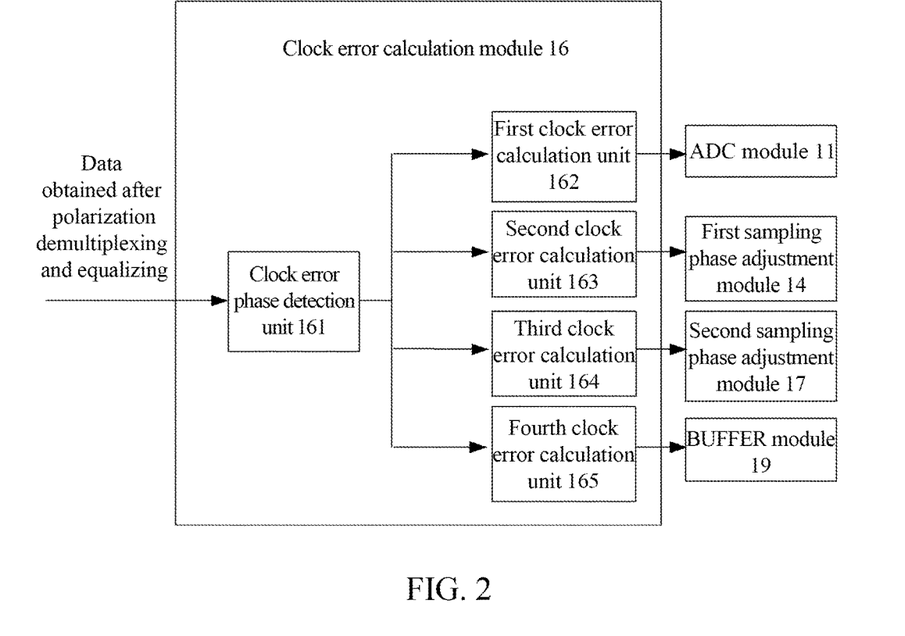
FIG. 2 is a structural schematic diagram of the clock error calculation module in FIG. 1.

Wherein, the structure of the clock error calculation module illustrated in FIG. 2 includes:

a clock error phase detection unit 161, configured to obtain a phase detection error based on a following expression:

$$e(m) = \sum_{i=1}^{N/2} conj(x_f^{eq\_out}(i)) \cdot x_f^{eq\_out}(i+N/2) +$$

$$\sum_{i=1}^{N/2} conj(y_f^{eq\_out}(i)) \cdot y_f^{eq\_out}(i+N/2),$$

wherein, $x_f^{eq\_out}$ and $y_f^{eq\_out}$ represent data of x, y in two polarization status obtained after polarization demultiplexing and equalizing, i is a frequency-domain index value, conj represents a conjugate operation, N is the number of points of a Fourier transforming module FT, m is an index of a phase detection, e(m) is the phase detection error, wherein, N is a positive integer;

then calculate the phase detection value corresponding to each frequency-domain data segment based on a following expression:

$\tau(m) = angle(e(m))/\pi$, wherein, $\tau(m)$ is a phase detection value, angle represents a phase angle operation;

a first clock error calculation unit 162, configured to filter the phase detection value for calculating the clock sampling error to obtain the clock sampling error;

a second clock error calculation unit 163, configured to filter the phase detection value for calculating the signal phase error compensation value to obtain the signal phase error compensation value;

a third clock error calculation unit 164, configured to filter the phase detection value for calculating the residual phase error compensation value to obtain the residual phase error compensation value;

a fourth clock error calculation unit 165, configured to filter the phase detection value for calculating an interpolating instruction, deleting instruction, or holding instruction, to obtain the interpolating instruction or the deleting instruction, or the holding instruction.

The embodiment of the present document further provides a clock recovery method, including: calculating a parameter for clock recovery based on data obtained by polarization demultiplexing and equalizing. With reference to the clock recovery device illustrated in FIG. 1, the ADC module, the first sampling phase adjustment module, the second sampling phase adjustment module, and the BUFFER module are configured to adjust the sampling clock and the sampling phase, and perform the sampling point holding operation, the sampling point deleting operation and the sampling point interpolating operation according to the calculated clock error parameter.

The ADC module 11 adjusts the sampling clock based on a sampling clock error value calculated by the clock error calculation module, and converts the analog signal into the digital signal, and then transmits the digital signal to the front-end digital signal processing module; the front-end digital signal processing module performs digital signal processing such as constant delay compensating, DC offset compensating, etc. and transmits the signal to the FT module; the FT module transforms the time-domain data into frequency-domain data, and then transmits the data to the first sampling phase adjustment module 14; the first sampling phase adjustment module performs phase adjustment on the data based on the signal phase error compensation value calculated by the clock error calculation module, and then transmits data on which the phase adjustment is performed to the polarization demultiplexing and equalizing module; the polarization demultiplexing and equalizing module performs separation of two polarization states and equalization processing and transmits the processed signal to the clock error calculation module and the second sampling phase adjustment module 17; the clock error calculation module calculates the clock sampling error, the signal phase error compensation value, the residual phase error compensation value, the sampling point holding instruction, the sampling point interpolating instruction, and the sampling deleting instruction based on the data obtained after polarization demultiplexing and equalizing module, and transmits, respectively, to the ADC module 11, the first sampling phase adjustment module 14, the second sampling phase adjustment module 17, and the BUFFER module 19; the second sampling phase adjustment module performs further phase adjustment on the data obtained after polarization demultiplexing and equalizing based on the residual phase error compensation value calculated by the clock error calculation module, and then transmits the data to the IFT module 18; the IFT module 18 transforms frequency-domain data into time-domain data, and then transmits the data to the BUFFER module; the BUFFER module performs the sampling point holding operation, the sampling point interpolating operation or the sampling point deleting operation based on the instruction of the clock error calculation module, and then transmits the data to other subsequent module of the receiver.

The clock error calculation module calculates the clock error based on the data obtained after polarization demultiplexing and equalizing. Wherein, the clock error detection module calculates the phase detection error:

(1) Calculating the clock error $$e(m) = \sum_{i=1}^{N/2} conj(x_f^{eq\_out}(i)) \cdot x_f^{eq\_out}(i+N/2) + \sum_{i=1}^{N/2} conj(y_f^{eq\_out}(i)) \cdot y_f^{eq\_out}(i+N/2)$$

Wherein, $x_f^{eq\_out}$ and $y_f^{eq\_out}$ represent polarization state data of x,y obtained after the polarization demultiplexing and equalizing module, i is a frequency-domain index value, conj represents a conjugate operation, N is the number of points, m is an index of the phase detection result, e(m) is a phase detection error, wherein, N is a positive integer.

(2) Performing the phase calculation based on the phase detection error $$\tau(m) = angle(e(m))/\pi$$

a phase detection value τ(m) is output as the phase detection result for each frequency-domain data segment, wherein, τ(m) is a phase detection value, angle represents a phase angle operation.

(3) Transmitting the phase detection result to the first clock error calculation unit, and calculating the clock frequency adjusting instruction of the ADC module by filtering, wherein, the clock frequency adjusting instruction includes the clock sampling error, adapting to relatively slowly changing clock error, filter coefficients may be set based on this condition.

(4) Transmitting the phase detection result to the second clock error calculation unit, and calculating the signal phase error compensation value suitable for the first sampling adjustment module by filtering; wherein, adapting to relatively fast changing clock error, filter coefficients may be set based on this condition.

(5) Transmitting the phase detection result to the third clock error calculation unit, and calculating the residual phase error compensation value suitable for the second sampling adjustment module by filtering; wherein, adapting to very fast changing clock error, filter coefficients may be set based on this condition.

(6) Transmitting the phase detection result to the fourth clock error calculation unit, and calculating the interpolating instruction, the deleting instruction, or the holding instruction, of the BUFFER module by filtering, wherein the interpolating instruction/deleting instruction indicates that the difference between data sampling points caused by the sampling clock error is one sampling point, and the holding instruction indicates that the difference between data sampling points caused by the sampling clock error is within one sampling point.

Figure 3:
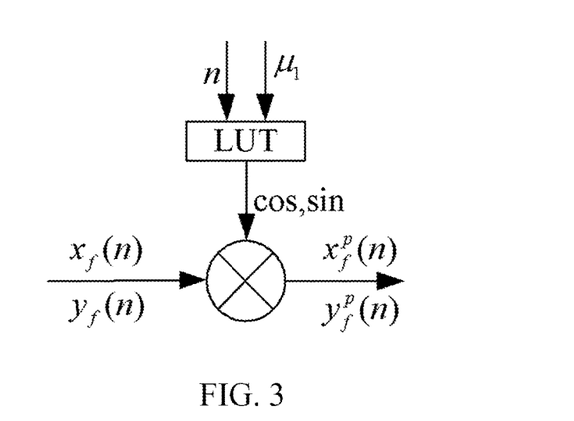
FIG. 3 is a schematic diagram of the implementation principle of the first sampling phase adjustment module and the second sampling phase adjustment module according to the first embodiment of the present document.

FIG. 3 is a schematic diagram of the principle of the phase adjustment of the first sampling phase adjustment module and the second sampling phase adjustment module according to the embodiment of the present document, cos and sin may be generated in the manner of using a look-up table or in any other manners.

The implementation of the first sampling phase adjustment module is the same as that of the second sampling phase adjustment module, a sampling phase adjustment is performed based on a phase adjustment value transmitted from the clock error calculation module, correspondingly, the sampling phase adjustment may be performed based on following expression:

$$x_f^p(n) = \begin{cases} x_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) & 1 \le n \le \frac{N}{2} \\ x_f(n) \cdot \left( \cos\left(\frac{2 \cdot \pi \cdot (n-N-1) \cdot \mu}{N}\right) + j \cdot \sin\left(\frac{2 \cdot \pi \cdot (n-N-1) \cdot \mu}{N}\right) \right) & \frac{N}{2}+1 \le n \le N \end{cases}$$

$$y_f^p(n) = \begin{cases} y_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) & 1 \le n \le \frac{N}{2} \\ y_f(n) \cdot \left( \cos\left(\frac{2 \cdot \pi \cdot (n-N-1) \cdot \mu}{N}\right) + j \cdot \sin\left(\frac{2 \cdot \pi \cdot (n-N-1) \cdot \mu}{N}\right) \right) & \frac{N}{2}+1 \le n \le N \end{cases}$$

wherein, n is a frequency-domain index, N is the number of points of FT, μ is a phase difference (the result obtained after filtering the clock error) required to adjust, $x_f(n), y_f(n)$ are frequency-domain data before the phase adjustment, $x_f^p(n), y_f^p(n)$ are frequency-domain data obtained after the phase adjustment, wherein, N is a positive integer.

Figure 4:
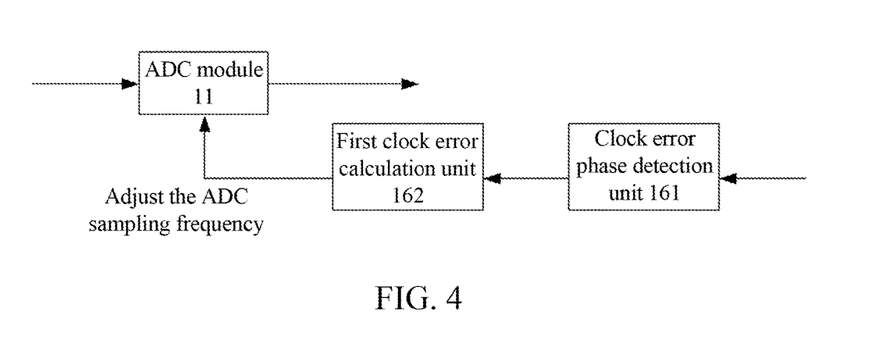
FIG. 4 is a schematic diagram of the implementation principle of the sampling frequency adjustment of the ADC module according to the first embodiment of the present document.

FIG. 4 is a schematic diagram of the implementation principle of the sampling frequency adjustment of the ADC module according to the embodiment of the present document.

The sampling clock of the ADC module 11 is adjusted based on the sampling clock error value transmitted from the clock error calculation module 16. For example, the sampling clock error module being in the deleting status for a long time indicates that the sampling clock of the ADC module is too fast, and the sampling clock is required to slow down, otherwise, the sampling clock error module being in the interpolating status for a long time indicates that the sampling clock of the ADC module is too slow, and the sampling clock is required to accelerate.

Figure 5:
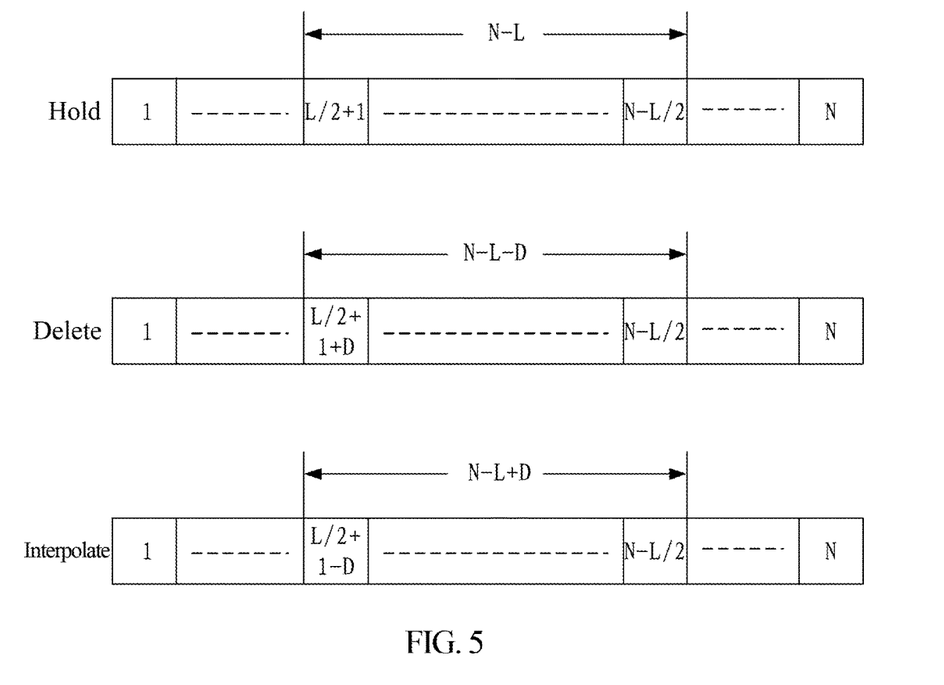
FIG. 5 is a schematic diagram of the sampling point holding operation, the sampling point interpolating operation, and the sampling point deleting operation implemented by the BUFFER module according to the first embodiment of the present document.

FIG. 5 is a schematic diagram of the sampling point holding operation, the sampling point interpolating operation, and the sampling point deleting operation implemented by the BUFFER module according to the embodiment of the present document. N is the number of points of FT, L is the number of points of redundant data, D is the number of sampling points which are required to interpolate or delete, and obtained by the error calculation module.

The BUFFER module performs the sampling point holding operation, sampling point interpolating operation, or sampling point deleting operation based on the sampling point holding instruction, the sampling point interpolating instruction, and the sampling point deleting operation calculated by the clock error calculation module.

The second embodiment of the present document will be described in conjunction with the accompanying drawings.

Figure 6:
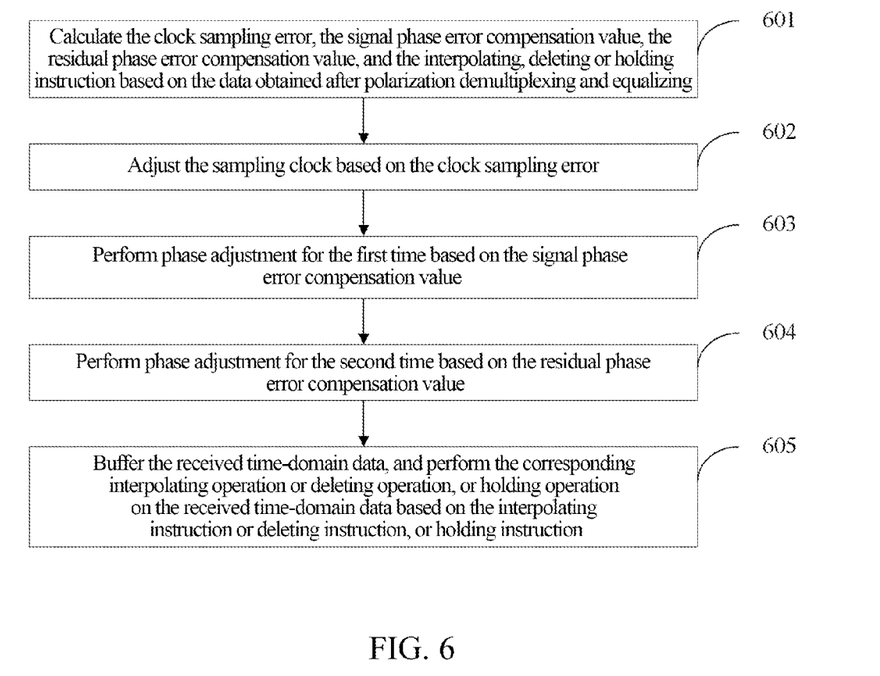
FIG. 6 is a flow chart of the clock recovery method provided by the second embodiment of the present document.

The embodiment of the present document provides a clock recovery method, in combination with the clock recovery device according to the first embodiment of the present document, the procedure for recovering the sampling clock illustrated in FIG. 6 includes:

In step 601, it is to calculate the clock sampling error, the signal phase error compensation value, the residual phase error compensation value, and the interpolating, deleting or holding instruction based on the data obtained after polarization demultiplexing and equalizing;

the step includes:

1. obtaining a phase detection error based on a following expression:

$$e(m) = \sum_{i=1}^{N/2} conj(x_f^{eq\_out}(i)) \cdot x_f^{eq\_out}(i+N/2) + \sum_{i=1}^{N/2} conj(y_f^{eq\_out}(i)) \cdot y_f^{eq\_out}(i+N/2),$$

wherein, $x_f^{eq\_out}$ and $y_f^{eq\_out}$ represent data of x, y in two polarization status obtained after polarization demultiplexing and equalizing, i is a frequency-domain index value, conj represents the conjugate operation, N is the number of points of FT, m is an index of a phase detection result, e(m) is a phase detection error, wherein, N is a positive integer;

2. calculating a phase detection value corresponding to each frequency-domain data segment based on following expression:

τ(m)=angle(e(m))/π, wherein, τ(m) is a phase detection value, angle represents a phase angle operation;

3. filtering the phase detection value for calculating the clock sampling error to obtain the clock sampling error;

4. filtering the phase detection value for calculating the signal phase error to obtain the signal phase error compensation value;

5. filtering the phase detection value for calculating the residual phase error to obtain the residual phase error compensation value;

6. filtering the phase detection value for calculating an interpolating instruction, deleting instruction, or holding instruction, to obtain the interpolating instruction, deleting instruction, or holding instruction.

In Step 602, it is to adjust the sampling clock based on the clock sampling error.

In this step, the sampling frequency of the ADC is changed based on the clock sampling error, thereafter, for the received data, the digital signal is sampled based on the changed ADC sampling frequency at first, and then front-end digital signal processing is performed on the sampled digital signal, and the data on which front-end digital signal processing is performed is converted into the data of the frequency-domain signal. Data of the frequency-domain signal is transmitted to the first sampling phase adjustment module.

In Step 603, it is to perform phase adjustment for the first time based on the signal phase error compensation value.

In this step, the phase adjustment is performed for the first time by the following expression based on the signal phase error compensation value:

$$x_f^p(n) =$$

$$\begin{cases} x_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) 1 \le n \le \frac{N}{2} \\ x_f(n) \cdot \left( \begin{array}{c} \cos\left(\frac{2 \cdot \pi \cdot (n-N-1) \cdot \mu}{N}\right) + \\ j \cdot \sin\left(\frac{2 \cdot \pi \cdot (n-N-1) \cdot \mu}{N}\right) \end{array} \right) \frac{N}{2}+1 \le n \le N \end{cases}$$

$$y_f^p(n) = \begin{cases} y_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) 1 \le n \le \frac{N}{2} \\ y_f(n) \cdot \left( \begin{array}{c} \cos\left(\frac{2 \cdot \pi \cdot (n-N-1) \cdot \mu}{N}\right) + \\ j \cdot \sin\left(\frac{2 \cdot \pi \cdot (n-N-1) \cdot \mu}{N}\right) \end{array} \right) \frac{N}{2}+1 \le n \le N \end{cases}$$

wherein, n is a frequency-domain index, N is the number of points of FT, μ is a phase difference required to adjust, $x_f(n), y_f(n)$ are frequency-domain data before the phase adjustment, $x_f^p(n), y_f^p(n)$ are frequency-domain data obtained after the phase adjustment, wherein, N is a positive integer.

Thereafter, it is to perform polarization separation on the digital signal data obtained after performing phase adjustment for the first time, and equalize the signal, the equalized data may be transmitted to the second sampling adjustment module for the second phase adjustment.

In Step 604, it is to perform phase adjustment for the second time based on the residual phase error compensation value.

In this step, the phase adjustment is performed for the second time by a following expression based on the residual phase error compensation value:

$$x_f^p(n) =$$

$$\begin{cases} x_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) 1 \le n \le \frac{N}{2} \\ x_f(n) \cdot \left( \begin{array}{c} \cos\left(\frac{2 \cdot \pi \cdot (n-N-1) \cdot \mu}{N}\right) + \\ j \cdot \sin\left(\frac{2 \cdot \pi \cdot (n-N-1) \cdot \mu}{N}\right) \end{array} \right) \frac{N}{2}+1 \le n \le N \end{cases}$$

$$y_f^p(n) = \begin{cases} y_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) 1 \le n \le \frac{N}{2} \\ y_f(n) \cdot \left( \begin{array}{c} \cos\left(\frac{2 \cdot \pi \cdot (n-N-1) \cdot \mu}{N}\right) + \\ j \cdot \sin\left(\frac{2 \cdot \pi \cdot (n-N-1) \cdot \mu}{N}\right) \end{array} \right) \frac{N}{2}+1 \le n \le N \end{cases}$$

wherein, n is a frequency-domain index, N is the number of points of FT, μ is a phase difference required to adjust, $x_f(n), y_f(n)$ are frequency-domain data before the phase adjustment, $x_f^p(n), y_f^p(n)$ are frequency-domain data obtained after performing phase adjustment, wherein, N is a positive integer.

Thereafter, frequency-domain data obtained after performing the phase adjustment for the second time may be converted into time-domain data by the IFT module for the following buffering.

In Step 605, it is to buffer the received time-domain data, and perform the corresponding interpolating operation or deleting operation, or holding operation on the received time-domain data based on the interpolating instruction or deleting instruction, or holding instruction.

In this step, the corresponding interpolating operation, deleting operation, or holding operation is performed by the BUFFER module based on the interpolating instruction or deleting instruction, or holding instruction calculated by the clock error calculation module.

The embodiment of the present document provides a clock recovery method and device, wherein, the clock sampling error, the signal phase error compensation value, and the residual phase error compensation value are calculated based on data obtained after polarization demultiplexing and equalizing, the sampling clock is adjusted based on the clock sampling error, the phase adjustment is performed for the first time based on the signal phase error compensation value, and then the phase adjustment is performed for the second time based on the residual phase error compensation value, thus the mechanism of three levels of error compensation is achieved to address the problem of the non-synchronization between the clock of the transmitter and the clock of the receiver.

The ordinary person skilled in the art can understand that all or part of steps of the above embodiments can be implemented by using a computer program procedure, the computer program can be stored in a computer readable memory medium, the computer program is executed on a corresponding hardware platform (such as a system, equipment, apparatus and device and so on), and when the program is carried out, one of the steps or a combination of the steps of the method embodiments is contained.

Alternatively, all or part of the steps of the above embodiments also can be implemented by using integrated circuits, these steps can be made into individual integrated circuit modules respectively, or multiple modules or steps of them can be made into a single integrated circuit module to be implemented. Therefore, the present document is not limited to any combination of hardware and software in a specific form.

Each device or function module or function unit in the above embodiments can be implemented through a universal calculating device, and they can be concentrated on a single calculating device or distributed in a network consisting of multiple calculating devices.

If implemented in a form of software function module and sold or used as an independent product, each device or function module or function unit in the above embodiments can be stored in a computer readable memory medium. The computer readable memory medium mentioned above can be read-only memory, disk or optical disk and so on.

Any skilled familiar with the art can easily conceive changes and substitutions within the technical scope disclosed by the present document, and these changes and substitutions shall be all covered within the protection scope of the present document. Therefore, the protection scope of the present document should be subject to the protection scope described in the claims.

INDUSTRIAL APPLICABILITY

The embodiment of the present document achieves the mechanism of three levels of error compensation for the clock to address the problem of the non-synchronization between the clock of the transmitter and the clock of the receiver. Consequently, there exists a strong industrial applicability.

What we claim is:

1. A clock recovery method, comprising:
    calculating, based on data obtained after polarization demultiplexing and equalizing a signal, a clock sampling error, a signal phase error compensation value, and a residual phase error compensation value;
    adjusting a sampling clock of an analog-to-digital converter ADC based on the clock sampling error; sampling an received analog signal, by the ADC, to generate a sampled digital signal based on the adjusted sampling clock;
    after performing front-end digital signal processing on the sampled digital signal, converting data obtained after front-end digital signal processing into frequency-domain signal;
    performing a first phase adjustment on the frequency-domain signal based on the signal phase error compensation value;
    performing the polarization demultiplexing and equalizing on the first phase adjusted frequency-domain signal; and
    performing a second phase adjustment on the polarization demultiplexed and equalized signal based on the residual phase error compensation value.

2. The clock recovery method of claim 1, wherein, the step of calculating, based on data obtained after polarization demultiplexing and equalizing a signal, a clock sampling error, a signal phase error compensation value, and a residual phase error compensation value, comprises:
    obtaining a phase detection error based on a following expression:

$$e(m) = \sum_{i=1}^{N/2} conj(x_f^{eq\_out}(i)) \cdot x_f^{eq\_out}(i+N/2) + \sum_{i=1}^{N/2} conj(y_f^{eq\_out}(i)) \cdot y_f^{eq\_out}(i+N/2),$$

wherein, $x_f^{eq\_out}$ and $y_f^{eq\_out}$ represent data of x, y in two polarization states obtained after polarization demultiplexing and equalizing, i is a frequency-domain index value, conj represents a conjugate operation, N is a number of points of a Fourier transforming module FT, m is an index of a phase detection result, e(m) is the phase detection error, wherein, N is a positive integer;
    calculating a phase detection value corresponding to each frequency-domain data segment based on a following expression:

$$\tau(m) = \text{angle}(e(m))/\pi,$$

wherein, $\tau(m)$ is the phase detection value, angle represents a phase angle operation;
    performing a first filter processing on the phase detection value to obtain the clock sampling error;
    performing a second filter processing on the phase detection value to obtain the signal phase error compensation value; and
    performing a third filter processing on the phase detection value to obtain the residual phase error compensation value.

3. The dock recovery method of claim 2, wherein, after the step of performing the second phase adjustment on the polarization demultiplexed and equalized signal based on the residual phase error compensation value, the method further comprises:
    transforming frequency-domain data obtained after performing the second phase adjustment into tire-domain data for subsequent buffering.

4. The clock recovery method of claim 3, wherein the method further comprises:
    performing a fourth filter processing on the phase detection value to obtain an interpolating instruction, a deleting instruction, or a holding instruction.

5. The clock recovery method of claim 4, wherein, after the step of transforming frequency-domain data obtained after performing the second phase adjustment into time-domain data for subsequent buffering, the method further comprises:
buffering received time-domain data; and
performing, respectively, a corresponding interpolating operation, deleting operation, or holding operation on the buffered received time-domain data based on the interpolating instruction, deleting instruction, or holding instruction.

6. The clock recovery method of claim 1, wherein, the step of adjusting a sampling clock of an analog-to-digital converter ADC based on the clock sampling error, comprises:
changing a sampling frequency of the analog-to-digital converter ADC based on the clock sampling error.

7. The clock recovery method of claim 1, wherein, the step of performing a first phase adjustment on the frequency-domain signal based on the signal phase error compensation value, comprises:
performing the first phase adjustment by a following expression based on the signal phase error compensation value:

$$x_f^p(n) = \begin{cases} x_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) & 1 \leq n \leq \frac{N}{2} \\ x_f(n) \cdot \left( \cos\left(\frac{2 \cdot \pi \cdot (n-N-1) \cdot \mu}{N}\right) + j \cdot \sin\left(\frac{2 \cdot \pi \cdot (n-N-1) \cdot \mu}{N}\right) \right) & \frac{N}{2}+1 \leq n \leq N \end{cases}$$

$$y_f^p(n) = \begin{cases} y_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) & 1 \leq n \leq \frac{N}{2} \\ y_f(n) \cdot \left( \cos\left(\frac{2 \cdot \pi \cdot (n-N-1) \cdot \mu}{N}\right) + j \cdot \sin\left(\frac{2 \cdot \pi \cdot (n-N-1) \cdot \mu}{N}\right) \right) & \frac{N}{2}+1 \leq n \leq N \end{cases}$$

wherein, n is a frequency-domain index, N is a number of points of FT, $\mu$ is a phase difference required to adjust, $x_f(n), y_f(n)$ are frequency-domain data before the phase adjustment, $x_f^p(n), y_f^p(n)$ are frequency-domain data obtained after the phase adjustment, wherein, N is a positive integer.

8. The clock recovery method of claim 1, wherein, the step of performing a second phase adjustment on the polarization demultiplexed and equalized signal based on the residual phase error compensation value, comprises:
performing the second phase adjustment by a following expression based on the residual phase error compensation value:

$$x_f^p(n) = \begin{cases} x_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) & 1 \leq n \leq \frac{N}{2} \\ x_f(n) \cdot \left( \cos\left(\frac{2 \cdot \pi \cdot (n-N-1) \cdot \mu}{N}\right) + j \cdot \sin\left(\frac{2 \cdot \pi \cdot (n-N-1) \cdot \mu}{N}\right) \right) & \frac{N}{2}+1 \leq n \leq N \end{cases}$$

$$y_f^p(n) = \begin{cases} y_f(n) \cdot \left( \cos\left(\frac{2 \cdot \pi \cdot (n-1) \cdot \mu}{N}\right) + j \cdot \sin\left(\frac{2 \cdot \pi \cdot (n-1) \cdot \mu}{N}\right) \right) & 1 \leq n \leq \frac{N}{2} \\ y_f(n) \cdot \left( \cos\left(\frac{2 \cdot \pi \cdot (n-N-1) \cdot \mu}{N}\right) + j \cdot \sin\left(\frac{2 \cdot \pi \cdot (n-N-1) \cdot \mu}{N}\right) \right) & \frac{N}{2}+1 \leq n \leq N \end{cases}$$

wherein, n is a frequency-domain index, N is a number of points of FT, $\mu$ is a phase difference required to adjust, $x_f(n), y_f(n)$ are frequency-domain data before the phase adjustment, $x_f^p(n), y_f^p(n)$ are frequency-domain data obtained after the phase adjustment, wherein, N is a positive integer.

9. A clock recovery device, comprising an analog-to-digital converter ADC circuit, a clock error calculation circuit, a first sampling phase adjustment circuit, a second sampling phase adjustment circuit, a front-end digital signal processing circuit, a polarization demultiplexing and equalizing circuit and a Fourier transforming FT circuit, wherein,
the clock error calculation circuit is configured to calculate, based on data obtained from the polarization demultiplexing and equalizing circuit, a clock sampling error, a signal phase error compensation value, and a residual phase error compensation value;
the ADC circuit is configured to adjust a sampling clock based on the clock sampling error; sample an received analog signal to generate a sampled digital signal based on the adjusted sampling clock;
the front-end digital signal processing circuit is configured to perform the front-end digital signal processing on the sampled digital signal;
the FT circuit is configured to convert a signal obtained from the front-end digital signal processing circuit into a frequency-domain signal;
the first sampling phase adjustment circuit is configured to perform a first phase adjustment on the frequency-domain signal based on the signal phase error compensation value;
the polarization demultiplexing and equalizing circuit is configured to perform the polarization demultiplexing and equalizing on the first phase adjusted frequency-domain signal; and
the second sampling phase adjustment circuit is configured to perform a second phase adjustment on the polarization demultiplexed and equalized signal based on the residual phase error compensation value.

10. The clock recovery device of claim 9, wherein, the clock error calculation circuit comprises:
a clock error phase detection circuit configured to obtain a phase detection error based on a following expression:

$$e(m) = \sum_{i=1}^{N/2} conj(x_f^{eq\_out}(i)) \cdot x_f^{eq\_out}(i+N/2) + \sum_{i=1}^{N/2} conj(y_f^{eq\_out}(i)) \cdot y_f^{eq\_out}(i+N/2),$$

wherein, $x_f^{eq\_out}$ and $y_f^{eq\_out}$ represent data of x, y in two polarization states obtained after polarization demultiplexing and equalizing, i is a frequency-domain index value, conj represents a conjugate operation, N is a number of points of a Fourier transforming module FT, m is an index of a phase detection result, e(m) is the phase detection error, wherein, N is a positive integer; and calculate a phase detection value corresponding to each frequency-domain data segment based on a following expression:

$$\tau(m)=\text{angle}(e(m))/\pi,$$

wherein, τ(m) is the phase detection value, angle represents a phase angle operation;

a first clock error calculation circuit configured to perform a first filter processing on the phase detection value to obtain the clock sampling error;

a second clock error calculation circuit configured to perform a second filter processing on the phase detection value to obtain the signal phase error compensation value; and a third clock error calculation circuit configured to perform a third filter processing on the phase detection value to obtain the residual phase error compensation value.

11. The clock recovery device of claim 10, wherein, the clock error calculation circuit further comprises:

a fourth clock error calculation circuit configured to perform a fourth filter processing on the phase detection value to obtain an interpolating instruction, a deleting instruction, or a holding instruction.

12. The clock recovery device according to claim 11, wherein, the device further comprises:

a BUFFER circuit configured to buffer received time-domain data, and perform, respectively, a corresponding interpolating operation, deleting operation, or holding operation on the buffered received time-domain data based on the interpolating instruction, deleting instruction, or holding instruction respectively.

* * * * *